US 6,658,446 B1

(12) United States Patent
Simony et al.

(10) Patent No.: US 6,658,446 B1
(45) Date of Patent: Dec. 2, 2003

(54) FAST CHAINABLE CARRY LOOK-AHEAD ADDER

(75) Inventors: Laurent Simony, Grenoble (FR); Stéphane Le Tual, Veurey Voiroize (FR); Marc Wingender, Saint Egreve (FR)

(73) Assignee: Atmel Grenoble S.A., Saint Egreve (FR)

( * ) Notice: Subject to any disclaimer, the term of this patent is extended or adjusted under 35 U.S.C. 154(b) by 0 days.

(21) Appl. No.: 09/647,537

(22) PCT Filed: Feb. 2, 2000

(86) PCT No.: PCT/FR00/00242

§ 371 (c)(1),
(2), (4) Date: Oct. 2, 2000

(87) PCT Pub. No.: WO00/46663

PCT Pub. Date: Aug. 10, 2000

(30) Foreign Application Priority Data

Feb. 2, 1999 (FR) .............................................. 99 01179

(51) Int. Cl.$^7$ .............................................. G06F 7/50
(52) U.S. Cl. ..................................... 708/700; 708/702
(58) Field of Search ................................. 708/700–714

(56) References Cited

U.S. PATENT DOCUMENTS

| | | | | | |
|---|---|---|---|---|---|
| 3,093,751 A | * | 6/1963 | Williamson | .................. | 708/703 |
| 3,900,724 A | * | 8/1975 | McIver et al. | .............. | 708/626 |
| 4,831,579 A | * | 5/1989 | Hara et al. | .................. | 708/701 |
| 5,132,921 A | * | 7/1992 | Kelley et al. | ............... | 708/701 |
| 5,175,703 A | * | 12/1992 | Ong | ........................... | 708/701 |
| 5,444,447 A | | 8/1995 | Wingender | | |
| 5,471,210 A | | 11/1995 | Wingender et al. | | |
| 5,487,025 A | * | 1/1996 | Partovi et al. | .............. | 708/714 |
| 5,499,203 A | * | 3/1996 | Grundland | .................. | 708/710 |
| 5,596,520 A | * | 1/1997 | Hara et al. | .................. | 708/707 |
| 5,717,622 A | * | 2/1998 | Kawamoto et al. | ......... | 708/701 |
| 6,166,674 A | | 12/2000 | Wingender et al. | | |

* cited by examiner

Primary Examiner—Chuong Dinh Ngo
(74) Attorney, Agent, or Firm—Oblon, Spivak, McClelland, Maier & Neustadt, P.C.

(57) ABSTRACT

A chainable adder receives bits (A, B, C) to give complementary sum outputs (SO, SO*) and carry outputs (CO, CO*).

A first stage has differential pairs (P1, P2, P3) receiving bits (A, B, C), respectively, and complements (A*, B*, C*), respectively. The pairs have common output arms and are powered by an identical current (I). First and second output arms include resistors (R1, R2, R3) and (R4, R5, R6), respectively, connected-in-series to a reference potential (M). The resistors define intermediate nodes (A1, A2, A3) in the first arm, (B1, B2, B3) in the second arm. Carry outputs are taken at nodes (A2, B2).

A second stage has differential pairs (P4, P5, P6) whose inputs are connected to nodes (A1, B3) for pair (P4), (A2, B2) for pair (P5), and (A3, B1) for pair (P6). Pairs (P4, P6) each have a common arm with the pair (P5) and a non-common arm. The sum outputs are constituted by a combination, according to an "OR" function, of logic states on the non-common arm of one of pairs (P4, P6) and on the common arm of another of pairs (P4, P6).

11 Claims, 3 Drawing Sheets

| A+B+C | CO | SO | A1 (RI) | A2 (RI) | A3 (RI) | B1 (RI) | B2 (RI) | B3 (RI) | B1<A3 | A2>B2 | A2>B2 |
|---|---|---|---|---|---|---|---|---|---|---|---|
| 0 | 0 | 0 | 7 | 4 | 1 | 10 | 10 | 10 | 0 | 0 | 0 |
| 1 | 0 | 1 | 8 | 6 | 4 | 9 | 8 | 7 | 0 | 0 | 1 |
| 2 | 1 | 0 | 9 | 8 | 7 | 8 | 6 | 4 | 0 | 1 | 1 |
| 3 | 1 | 1 | 10 | 10 | 10 | 7 | 4 | 1 | 1 | 1 | 1 |

FIG.4

| A+B+C | SO | SO* | A1<B3 | B3<A1 & A2<B2 | B2<A2 & A3<B1 | B1<A3 |
|---|---|---|---|---|---|---|
| 0 | 0 | 1 | 1 | 0 | 0 | 0 |
| 1 | 1 | 0 | 0 | 1 | 0 | 0 |
| 2 | 0 | 1 | 0 | 0 | 1 | 0 |
| 3 | 1 | 0 | 0 | 0 | 0 | 1 |

FIG.5

| CONSUMPTION BY MODULE(5V) | tpc | tps |
|---|---|---|
| 0,322mW | 1,87ns | 3,42ns |
| 0,645mW | 0,95ns | 1,69ns |
| 1,29mW | 0,48ns | 0,84ns |
| 2,58mW | 0,24ns | 0,42ns |
| 5,20mW | 0,13ns | 0,22ns |
| 10,5mW | 0,083ns | 0,12ns |
| 21,0mW | 0,066ns | 0,090ns |
| 42,0mW | 0,069ns | 0,098ns |

FIG.6

FAST CHAINABLE CARRY LOOK-AHEAD ADDER

BACKGROUND OF THE INVENTION

1. Field of the Invention

The invention relates to an elementary chainable adder working at high frequencies, performing a binary summation of two input bits A and B and one carry input C.

2. Discussion of the Background

Since the binary sum can vary between 00 and 11, the adder has a least significant bit output SO and a most significant bit output CO (or carry output).

The truth table of an elementary chainable adder 10, schematically shown in FIG. 1*a*, is given by the table of FIG. 1*b* showing all the possible binary states of the input bits A, B, C and the corresponding states of the least significant output SO and most significant output CO.

The elementary chainable adder 10 is a building block for adders that can sum up M words of N bits, M being an integer greater than or equal to 2.

FIG. 2 shows a typical architecture 20 of an adder of this kind comprising elementary chainable adders 10.

An elementary adder 12 processing the bits A(i), B(i), C(i) having the place value p, with i=0,1,2, . . . N−1, receives its carry input C from the carry output CO of the elementary adder 13 processing the bits with the place value (p−1), its own output CO feeding the carry input C of the elementary adder 14 processing the bits with the place value (p+1). The inputs A and B of the elementary adder may serve directly as inputs for another adder of the same type. This notion of chainability assumes a compatibility of the input and output levels.

Let tps be the propagation time between the inputs A or B, and the least significant value output SO and let tpc be the propagation time between the inputs A or B, and the carry output CO of an elementary chainable adder. For the sum of two N bit words, there should be a total time equal to N.tpc+tps. Thus, the propagation time of the complete structure depends on tpc.

The performance criteria sought for an adder module to be made in integrated circuit technology are chiefly:

propagation time consumption circuit working with supply voltages from 2.7 volts. The maximum voltage is fixed by the behaviour under voltage of the technology used.

chainability output SO positioned before the carry CO (i.e. tpc<tps) low surface area on silicon At present there are different types of adders. The CMOS adders have a very high density of integration and low power consumption. These types of CMOS circuits have a propagation time that is excessively great for applications requiring fast computation. The use of the faster ECL technology entails the drawbacks of high consumption and large surface area for the structure.

SUMMARY OF THE INVENTION

In order to overcome the drawbacks of the prior art, the invention proposes a chainable adder receiving three bits A, B, C to give two complementary sum outputs and two complementary carry outputs comprising:

a first stage with three differential pairs P1, P2, P3 each receiving a respective bit A, B, C and its complement A*, B*, C*, the three pairs having common output arms and being powered by an identical current I, the output arms each comprising three resistors R1, R2, R3 and R4, R5, R6 in series connected to a reference potential, these resistors defining three intermediate nodes A1, A2, A3 in the first arm, B1, B2, B3 in the second arm, the carry outputs being taken at the nodes A2 and B2, a second stage comprising three other differential pairs P4, P5, P6 whose inputs are connected to the nodes A1 and B3 for the pair P4, the nodes A2 and B2 for the pair P5 and the nodes A3 and B1 for the pair P6, the pairs P4 and P6 each having a common arm with the pair P5 and an arm that is not common, the sum outputs of the adder stage being each constituted by the combination, according to an "or" function, of the logic states appearing respectively on the non-common arm of one of the pairs P4 and P6 and on the common arm of the other pair.

The original structure of the adder according to the invention has the advantage of reducing the number of logic layers needed for the addition to the minimum. Indeed, the least significant output is obtained in two logic layers and the carry output is stabilized before the least significant output in a single layer. This substantially reduces the propagation time of the adder as compared with the prior art adders.

The term <<logic layer>> is understood here to mean the elementary stages that use the amplifier effect of the transistor (between its base and its collector) to go from input to output. This is by opposition to effects of the "follower" type which are also used here and are far speedier than the amplifier effects, and are therefore negligible compared with these effects in terms of propagation time.

Other advantages of this structure lie in the minimizing of the number of components used and in the reduction of consumption.

Hereinafter, the logic complement is indicated by an asterisk. In the drawings, it is conventionally represented by a bar above the name of the

BRIEF DISCUSSION OF THE DRAWINGS

The invention will be understood more clearly from the following detailed description made with reference to the appended drawings, of which:

FIG. 1*a* and 1*b*, already described, respectively represent an elementary prior art chainable adder and its truth table.

FIG. 2, already described, shows a typical architecture of an adder that can sum of M words of N bits, comprising the elementary chainable adders of FIG. 1*a*.

FIG. 4 shows a table of the levels and states of the first stage of the adder of FIG. 3.

FIG. 5 shows a table of states of the second stage of the adder of FIG. 3.

FIG. 6 shows a table of results of the adder of FIG. 3.

DESCRIPTION OF THE PREFERRED EMBODIMENTS

Figure 1A:
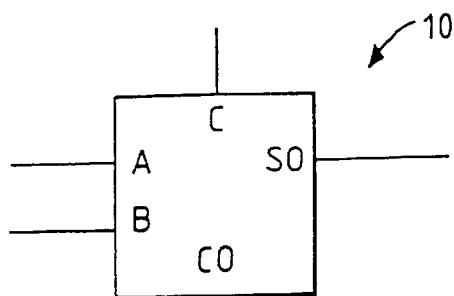
Figure 1B:
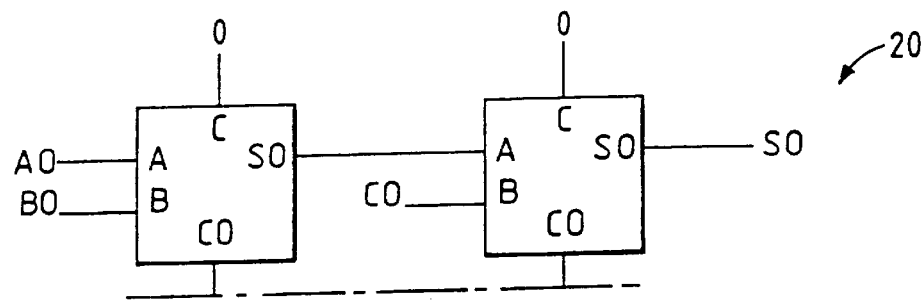
Figure 2:
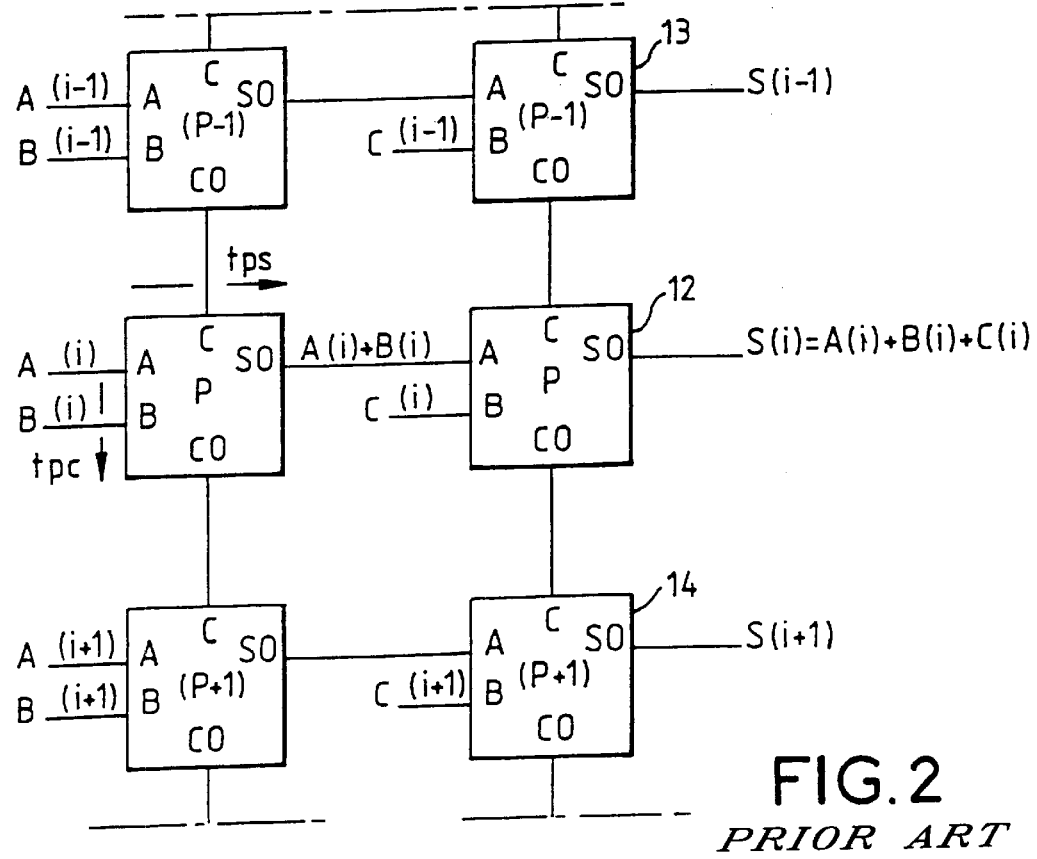
Figure 3:
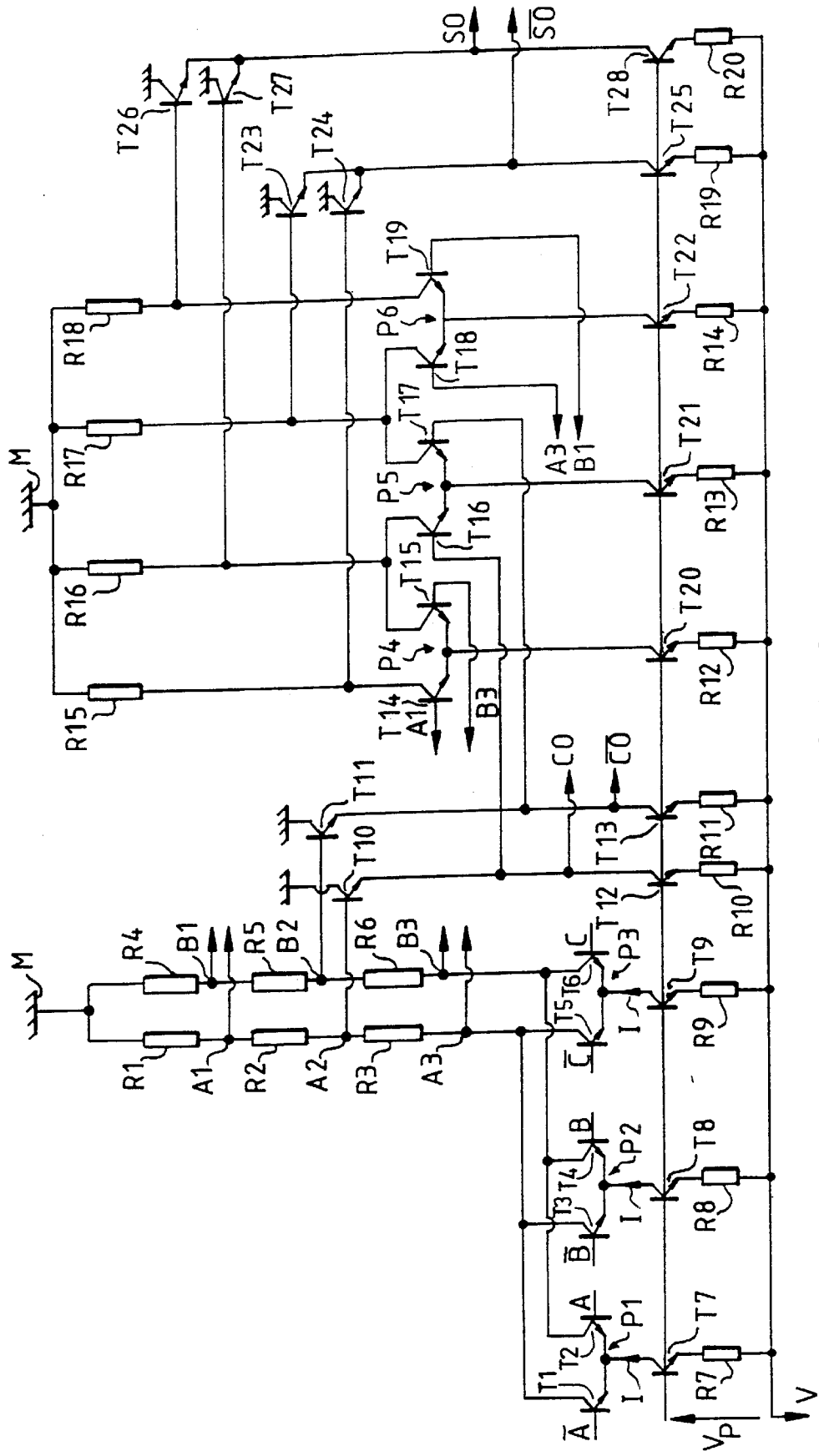
FIG. 3 shows an embodiment, according to the invention, of an elementary, chainable adder stage.

FIG. 3 shows an elementary chainable adder according to the invention, made out of NPN type transistors. The adder comprises a first stage, having three differential pairs P1, P2, P3, generating two complementary carry outputs CO and CO* and a second stage, having three other differential pairs P4, P5, P6, generating two complementary sum outputs SO and SO*.

The adder is supplied with a potential V with respect to a reference potential represented by a ground M of the adder.

A bias voltage Vp with respect to the supply potential V biases the bases of the current generator transistors used in the adder. In this embodiment, the supply potential is equal to −5 volts and the bias potential of the current generators is equal to 1.2 volts with respect to the supply potential of −5 volts, giving 3,8 volts.

In reality, this value of 1.2 volts is approximate. Indeed, it is the currents that must be controlled in this structure. The bias potential will be chosen in such a way that the generators (or sources) of useful current will have the nominal values desired.

Each pair P1, P2, P3 of the first stage of the adder is constituted by two transistors T1 and T2 for the pair P1, transistors T3 and T4 for the pair P2, transistors T5 and T6 for the pair P3. The bases of the transistors of each pair P1, P2, P3 respectively receive one bit A, B, C for one of the transistors of each pair and its complement A*, B*, C* for the other transistor.

The emitters, which are connected to one another for each differential pair of the first stage, are respectively connected to the collectors of the transistors T7, T8 and T9 working as current generators imposing a current I in each differential pair, the transistors T7,T8 and T9 being connected respectively by their emitters to the negative potential V by means of the resistors R7, R8 and R9, and by their bases to a bias potential Vp equal to 1.2 volts.

It is for reasons of precision of the currents that a resistor (R7, R8, R9) is inserted between the emitter of the transistor (T7, T8, T9) and the negative supply (−5 volts). This resistor is called a degeneracy resistor and the voltage at its terminals is called a degeneracy voltage. In the case of the embodiment of FIG. 3, we have:

Vbe+degeneracy voltage, equal to about 1.2 volts.

With Vbe=emitter/base voltage of the transistors T7, T8 and T9, Hence, the degeneracy voltage is equal to about 0.5 volt. This degeneracy voltage could have been made zero at the cost of less precise control of the currents. It would therefore be possible to reduce this bias voltage (by 1.2 volt) and make further gains on the minimum supply voltage.

The collectors of the transistors fed with the complementary bits A*, B*, C* are connected to one another at one end of a first arm comprising three resistors R1, R2 and R3 in series, the other end of the first arm being connected to the ground M of the adder. In the same way, the collectors of the transistors fed with the bits A, B, C are mutually connected to one end of a second arm comprising three other resistors R4, R5 and R6 in series, the other end of the arm being connected to the ground M of the adder.

In the first arm, the three resistors R1, R2 and R3, which are series-connected, define three intermediate nodes, a node A1 at the connection point of the resistors R1 and R2, a node A2 at the connection point of the resistors R2 and R3, and a node A3 at the connection point of the resistor R3 and the collectors of the transistors T1, T3 and T5, fed with the complementary bits A*, B*, C* and, in the second arm, the other three resistors R4, R5 and R6 series-connected, defining three other intermediate nodes, a node B1 at the connection point of the resistors R4 and R5, a node B2 at the connection point of the resistors R5 and R6, and a node B3 at the connection point of the resistor R6 and the collectors of the transistors T2, T4 and T6 fed with the bits A, B, C.

The carry outputs CO and CO* are taken at the nodes A2 and B2. through the base/emitter junctions of a follower transistor T10 for the carry output CO and another follower transistor T11 for the complementary carry output CO*, either one or the other of the follower transistors T10 and T11 being connected by their collectors to the ground M, and by their emitters respectively to the collectors of transistors T12 and T13 mounted as current generators, the transistors T12 and T13 being connected by their emitters to the negative potential V, respectively by means of the resistors R10 and R11, their bases being connected to the bias potential Vp.

The other three differential pairs P4, P5, P6 of the second stage of the adder are connected to the nodes A1,A2, A3 and, B1, B2, B3 of the first stage in order to constitute the complementary sum outputs SO and SO*.

The pair P4 comprises two transistors T14 and T15, whose bases are respectively connected to the nodes A1 and B3, the pair P5 comprising two transistors T16 and T17 whose bases are respectively connected to the nodes A2 and B2 through the base/emitter junctions of the follower transistors T10 and T11, the pair P6 comprising two transistors T18 and T19 whose bases are respectively connected to the nodes A3 and B1.

The mutually connected emitters of the transistors of each differential pair P4, P5, P6 of the second stage are connected respectively to the collectors of transistors T20, T21 and T22 working as current generators, imposing a current that is the same in each of the differential pairs P4, P5 and P6, the transistors T20, T21 and T22 being connected by their emitters to the negative potential V, respectively by means of the degeneracy resistors R12, R13 and R14, and being connected by their bases to the bias potential Vp.

Each of the pairs P4 and P6 has a common arm with the pair P5 and a non-common arm.

The transistor T14 of the non-common arm of the pair P4 is connected by its collector to the ground M through a resistor R15, the collectors of the transistors T15 and T16 of the common arm of the pairs P4 and P5 being connected to one another and being connected to the ground M by means of a common load resistor R16.

Symmetrically, the collectors of the transistors T17 and T18 of the common arm of the differential pairs P5 and P6 are connected together and connected to the ground M by means of a common load resistor R17. The transistor T1 9 of the non-common arm of the differential pair P6 is connected by its collector to the ground M through a resistor R18 The sum outputs SO and SO* of the adder stage give logic states that are constituted by a combination, according to an <<or >> function, of the logic states appearing at the non-common arm of one of the pairs P4 and P6 and at the common arm of the other one of these pairs.

For the output SO a combination is made, according to an <<or >> function, of the logic state present on the collectors of the transistors T15, T16 (common arm with P4 and P5) and the logic state present on the collector of the transistor T19 (non-common arm of P6).

Symmetrically for the output SO*, the logic states present on the collectors of T14 and of T17, T18 are combined.

For the output SO*, the invention uses transistors T23 and T24 which have their collectors connected to the ground M and their emitters connected to one another and to the collector of a transistor T25 mounted as a current generator, the transistor T25 being connected by its emitter to the negative potential V by means of a resistor R19, its base being connected to the bias potential Vp.

The base of the transistor T24 is connected to the collector of the transistor T14 of the non-common arm of the pair P4, the base of the transistor T23 being connected to the collectors of the transistors T17, T18 of the common arm of the pairs P5 and P6.

For the output SO, the invention uses transistors T26 and T27 whose collectors are connected to the ground M and whose emitters are connected to one another and to the collector of a transistor T28 mounted as a current generator, the transistor T28 being connected by its emitter to the negative potential V by means of a resistor R20, and by its base to the bias potential Vp.

The base of the transistor T26 is connected to the collector of the transistor T19 of the non-common arm of the pair P6, the base of the transistor T27 being connected to the collectors of the transistors T15 and T16 of the common arm of the pairs P4 and P5.

The sum outputs SO and SO* of the adder are obtained respectively on the emitters of the transistors T26 and T27 and on the emitters of the transistors T23 et T24.

We shall hereinafter describe the working of the adder according to the invention.

Let I be the current imposed in each differential pair P1, P2, P3 of the first stage of the adder. The resistors R1, R2, R3 of the first arm and the resistors R4, R5, R6 of the second arm have the same value value R.

Depending on the binary state of the bits A, B, C, the current in each of the arms may take the values 0,I, 2.I, 3.I. Let us suppose arbitrarily, to make it easier to explain the operation, that the supply voltage V is equal to 10.R.I, which makes it possible to compute the values of the voltages, expressed in number of times R.I, appearing at the level of the nodes A1, A2, A3 and B1, B2, B3 as a function of the logic states taken by the bits A, B, C.

To avoid having recourse to comparison thresholds, crossed differential comparisons are made. In other words, A1 is compared with B3, A2 with B2 and A3 with B1. These comparisons are made by the second stage of the adder, as described here above.

The table of FIG. 4, in which the first three columns starting from the left recall the truth table of the adder, give a view, as a function of the sum of the three inputs bits A+B+C, of the voltages at the different nodes A1, A2, A3 and B1, B2, B3 of the two arms of the first stage of the adder as well as the states of the comparisons (B1<A3), (A2>B2) and (A2>B2) on the basis of these voltages. The values of the voltages at the different nodes are represented in the table of FIG. 4 in the form of a number of times R.I.

It is observed that the column (A2>B2) corresponds to the output CO desired. We therefore have the output CO available in a single electronic layer, the propagation time of the followers T10 and T11 being negligible.

Furthermore, the last three columns of the table of FIG. 4 which represent the states of the comparisons, show that there is a thermometrical code, the "ones" gradually replacing the "Zeros" from column to column, thus enabling the creation of a logic function, set up by the second stage of the adder, the states of which are shown in the table of FIG. 5.

Thus, a "1" is obtained (last four columns of the table of FIG. 5), and this "1" shifts from column to column as a function of the sum of the bits (A+B+C). This function is a mobile index similar to the one that exists in a "flash" type analog-digital converter. The mobile index serves to select a ROM input whose output gives the expected digital value.

In the case of the adder of FIG. 3, since the output CO is already obtained at the first stage of the adder, all that remains to be decoded is the sum output SO.

The sum output SO is obtained by performing the wired <<or >> function of the columns (B3<A1 and A2<B2) and (B1<A3), while the wired "or" function of the two remaining columns (B2<A2 and A3<B1) and (A1<B3) gives the complementary output SO* (see the table in FIG. 5). The electrical diagram is a direct result of these observations.

It must be noted that the output CO can be obtained by performing the wired <<or>> function of the last two columns of the table of FIG. 5, but this means that the carry output will not have been a look-ahead carry.

It would have also been possible to obtain the sum output SO in the form of combinational logic. However, this leads to the stacking of a larger number of transistors requiring the use of a higher supply voltage, hence a less efficient adder.

The followers T10 and T11 provide for the fan-out of the carry CO and its complement CO* while ensuring the compatibility of the levels with an adder element of the same type.

The minimum value needed for the voltage unit R.I should make it possible to accurately switch over the comparators made with the differential pairs of the elementary adder. A value of about 100 millivolts is sufficient for the interpretation of one of the logic levels and prevents the saturation of one of the transistors.

The differential value of the complementary outputs SO and SO* is at least 2.R.I, and this differential voltage, which is output by the follower transistors T23, T24 and T26, T27, enables direct entry into adders of the same type, thus meeting the condition of chainability. Furthermore, it is <<electrically better >> under low impedance, to enter the levels of the complementary outputs CO, CO* on the mobile index comparator (differential pair P5), rather than to make direct use of the levels of the nodes A2, B2.

The mobile index comparator has the advantage of not requiring the stacking of the transistors. It must be seen to it that the transistors do not get saturated by limiting the value R.I used as a charge, while at the same time ensuring an accurate level at differential output. An R.I value of 150 millivolts is appropriate.

The performance of the wired <<or>> functions by bipolar transistors actually means using these transistors as followers rather than as amplifiers. This is faster.

The chainable elementary adder according to the invention may work with a minimum supply voltage of about 2.7 volts, because there is no stacking of transistors. This limits the power dissipation.

A complete elementary adder according to the invention requires 28 transistors. This is smaller than the number of transistors necessary for the adders in CMOS or ECL technology.

At a given supply voltage, it is possible to vary the power consumed by varying the current I injected. The resistors vary inversely to the current (constant product R.I).

It is useful to vary the power because it reduces the propagation time and therefore brings about an inversely proportional increase in the operating frequency.

The table of FIG. 6 shows the results obtained for an embodiment of the adder according to the invention, for which the resistors have the following values:

Arms of the pairs P1, P2, P3: R1 to R6=320 ohms;
Arms of the pairs P4, P5, P6: R15 to R18=1000 ohms; and
Current generators: R7, R8, R9=1800 ohms;
  R10, R11, R19, R20=5000 ohms and
  R12 to R14=3400 ohms.

This table shows that the fact of multiplying the consumption by two divides the propagation time by two. If the currents are fixed, the consumption is proportional to the supply voltage.

The longest propagation time corresponds to the case where the result of the sum of the bits (A+B+C) goes from 0 to 3 or from 3 to 0, it being known that, in these cases, the mobile index should shift by three positions sequentially.

It is observed that, over a wide range of operation, tps is substantially equal to twice tpc. In any case, tpc is smaller than tps.

The other technologies proposed in the prior art are nevertheless economical and perform less well than that proposed by the invention. In certain cases, the structure deals only with the propagation of the carry.

The structure described may be used in a variant with a supply voltage of 3 volts enabling a reduction in consumption.

The chainable adder may be used in all digital applications requiring fast addition, especially in real-time fast signal-processing algorithms (used to make impulse response filters).

What is claimed is:

1. Chainable adder receiving three bits A, B, C to give two complementary sum outputs (SO, SO*) and two complementary carry outputs (CO, CO*) comprising:

a first stage having three differential pairs P1, P2, P3 each receiving a respective bit A, B, C and its complement A*, B*, C*, the three pairs having common output arms and being each powered by an identical current I, the output arms each comprising three resistors R1, R2, R3 and R4, R5, R6 in series connected to a reference potential (M), these resistors defining three intermediate nodes A1, A2, A3 in a first arm of the output arms, B1, B2, B3 in a second arm of the output arms, the carry outputs being taken at the nodes A2 and B2, a second stage comprising three other differential pairs P4, P5, P6 whose inputs are connected to the nodes A1 and B3 for the pair P4, A2 and B2 for the pair P5 and A3 and B1 for the pair P6, the pairs P4 and P6 each having a common arm with the pair P5 and an arm that is not common, the sum outputs of the adder stage being each constituted by a combination, according to an "OR" function, of logic states appearing respectively on the non-common arm of one of the pairs P4 and P6 and on the common arm of the other pair.

2. Chainable adder according to claim 1, characterized in that it is powered by a potential V with respect to a reference potential represented by a ground (M) of the adder and in that each pair P1, P2, P3 of the first stage of the adder is constituted by two transistors T1 and T2 for the pair P1, T3 and T4 for the pair P2, T5 and T6 for the pair P3, the bases of the transistors of each pair P1, P2, P3 respectively receiving the bit A, B, C for one of the transistors of each pair and its complement A*, B*, C* for the other transistor, the emitters that are connected to one another for each differential pair of the first stage being respectively connected to the collectors of the transistors T7, T8 and T9 working as current generators imposing a current I in each differential pair, these transistors T7, T8 and T9 being connected respectively by their emitters to the potential V by means of the resistors R7, R8 and R9, and by their bases to a bias potential Vp, the collectors of the transistors fed with the complementary bits A*, B*, C* being connected to one another at one end of the first arm comprising the three resistors R1, R2 and R3 in series, the other end of the first arm being connected to the ground (M) of the adder, the collectors of the transistors fed with the bits A, B, C being mutually connected to one end of a second arm comprising the other three resistors R4, R5 and R6 in series, the other end of the arm being connected to the ground (M) of the adder, the three resistors R1, R2 and R3, which are series-connected, defining three intermediate nodes, the node A1 at the connection point of the resistors R1 and R2, the node A2 at the connection point of the resistors R2 and R3, and the node A3 at the connection point of the resistor R3 and the collectors of the transistors T1, T3 and T5, fed with the complementary bits A*, B*, C* and, in the second arm, the other three resistors R4, R5 and R6 series-connected, defining three other intermediate nodes, the node B1 at the connection point of the resistors R4 and R5, the node B2 at the connection point of the resistors R5 and R6, and the node B3 at the connection point of the resistor R6 and the collectors of the transistors T2, T4 and T6 fed with the bits A, B, C.

3. Chainable adder according to claim 2, characterized in that the carry outputs (CO, CO*) are taken at the nodes A2 and B2 through the base/emitter junctions of a follower transistor T10 for the carry output (CO) and another follower transistor T11 for the complementary carry output (CO*), either one or the other of the follower transistors (T10, T11) being connected by their collectors to the ground (M), and by their emitters respectively to the collectors of transistors T12 and T13 mounted as current generators, these transistors T12 and T13 being connected by their emitters to the negative potential V, respectively by means of the resistors R10 and R11, their bases being connected to the bias potential Vp.

4. Chainable adder according to claim 3, characterized in that the other three differential pairs P4, P5, P6 of the second stage of the adder are connected to the nodes A1, A2, A3 and B1, B2, B3 of the first stage in order to constitute the complementary sum outputs (SO, SO*), the pair P4 comprising two transistors T14 and T15, whose bases are respectively connected to the nodes A1 and B3, the pair P5 comprising two transistors T16 and T17, whose bases are respectively connected to the nodes A2 and B2 through the base/emitter junctions of the follower transistors T10 and T11, the pair P6 comprising two transistors T18 and T19, whose bases are respectively connected to the nodes A3 and B1, the mutually connected emitters of each differential pair P4, P5, P6 of the second stage being connected respectively to the collectors of transistors T20, T21 and T22 working as current generators, imposing a current that is the same in each of the differential pairs P4, P5 and P6, the transistors T20, T21 and T22 being connected by their emitters to the potential V, respectively by means of degeneracy resistors R12, R13 and R14, and being connected by their bases to the bias potential Vp, the transistor T14 of the non-common arm of the pair P4 being connected by its collector to the ground (M) through a resistor R15, the collectors of the transistors T15 and T16 of the common arm of the pairs P4 and P5 being connected to one another and being connected to the ground (M) by means of a common load resistor R16 and, symmetrically, the collectors of the transistors T17 and T18 of the common arm of the differential pairs P5 and P6 being connected together and being connected to the ground (M) by means of a common load resistor R17, the transistor T19 of the non-common arm of the differential pair P6 being connected by its collector to the ground (M) through a resistor R18.

5. Chainable adder according to claim 3, characterized in that it is made out of NPN type transistors, the potential V being negative with respect to the ground (M) of the adder.

6. Chainable adder according to claim 2, characterized in that the other three differential pairs P4, P5, P6 of the second stage of the adder are connected to the nodes A1, A2, A3 and B1, B2, B3 of the first stage in order to constitute the complementary sum outputs (SO, SO*), the pair P4 comprising two transistors T14 and T15, whose bases are respectively connected to the nodes A1 and B3, the pair P5 comprising two transistors T16 and T17, whose bases are respectively connected to the nodes A2 and B2 through the base/emitter junctions of the follower transistors T10 and T11, the pair P6 comprising two transistors T18 and T19, whose bases are respectively connected to the nodes A3 and B1, the mutually connected emitters of each differential pair P4, P5, P6 of the second stage being connected respectively to the collectors of transistors T20, T21 and T22 working as current generators, imposing a current that is the same in each of the differential pairs P4, P5 and P6, the transistors T20, T21 and T22 being connected by their emitters to the potential V, respectively by means of degeneracy resistors R12, R13 and R14, and being connected by their bases to the bias potential Vp, the transistor T14 of the non-common arm of the pair P4 being connected by its collector to the ground (M) through a resistor R15, the collectors of the transistors T15 and T16 of the common arm of the pairs P4 and P5 being connected to one another and being connected to the ground (M) by means of a common load resistor R16 and, symmetrically, the collectors of the transistors T17 and T18 of the common arm of the differential pairs P5 and P6 being connected together and being connected to the ground (M) by means of a common load resistor R17, the transistor T19 of the non-common arm of the differential pair P6 being connected by its collector to the ground (M) through a resistor R18.

7. Chainable adder according to claim 6, characterized in that, for the output SO a combination is made, according to an "OR" function, of the logic state present on the collectors of the transistors T15, T16 of the arm common to P4 and P5 and the logic state present on the collector of the transistor T19 of the non-common arm of P6 and, symmetrically, for the output SO*, a combination is made of the logic states present on the collectors of T14 and of T17, T18 and in that, for the output SO*, transistors T23 and T24 are used, with their collectors connected to the ground (M) and their emitters connected to one another and to the collector of a transistor T25 mounted as a current generator, the transistor T25 being connected by its emitter to the potential V by means of a resistor R19, its base being connected to the bias potential Vp, the base of the transistor T24 being connected to the collector of the transistor T14 of the non-common arm of the pair P4, the base of the transistor T23 being connected to the collectors of the transistors T17, T18 of the common arm of the pairs of P5 and P6, and in that, for the output SO, transistors T26 and T27 are used with their collectors connected to the ground (M) and their emitters connected to one another and to the collector of a transistor T28 mounted as a current generator, the transistor T28 being connected by its emitter to the potential V by means of a resistor R20, and by its base to the bias potential Vp, the base of the transistor T26 being connected to the collector of the transistor T19 of the non-common arm of the pair P6, the base of the transistor T27 being connected to the collectors of the transistors T15 and T16 of the common arm of the pairs P4 and P5.

8. Chainable adder according to claim 7, characterized in that it is made out of NPN type transistors, the potential V being negative with respect to the ground (M) of the adder.

9. Chainable adder according to claim 6, characterized in that it is made out of NPN type transistors, the potential V being negative with respect to the ground (M) of the adder.

10. Chainable adder according to claim 2, characterized in that it is made out of NPN type transistors, the potential V being negative with respect to the ground (M) of the adder.

11. Chainable adder according to claim 1, characterized in that it is made out of NPN type transistors, the potential V being negative with respect to the ground (M) of the adder.

* * * * *